United States Patent
Dorner et al.

(10) Patent No.: US 8,766,574 B2
(45) Date of Patent: Jul. 1, 2014

(54) METHOD AND CONTROL DEVICE FOR OPERATING A THREE-PHASE BRUSHLESS DIRECT CURRENT MOTOR

(71) Applicant: Brose Fahrzeugteile GmbH & Co. Kommanditgesellschaft, Hallstadt, Hallstadt (DE)

(72) Inventors: Thomas Dorner, Nuremberg (DE); Juergen Groth, Nuremberg (DE); Heiko Engelhardt, Nuremberg (DE)

(73) Assignee: Brose Fahrzeugteile GmbH & Co. KG, Hallstadt, Hallstadt (DE)

( * ) Notice: Subject to any disclaimer, the term of this patent is extended or adjusted under 35 U.S.C. 154(b) by 0 days.

(21) Appl. No.: 13/669,834

(22) Filed: Nov. 6, 2012

(65) Prior Publication Data

US 2013/0063060 A1    Mar. 14, 2013

Related U.S. Application Data

(63) Continuation of application No. PCT/EP2011/001492, filed on Mar. 24, 2011.

(30) Foreign Application Priority Data

May 6, 2010    (DE) .......................... 10 2010 019 494

(51) Int. Cl.
H02P 23/12    (2006.01)
(52) U.S. Cl.
USPC ............. 318/400.14; 318/400.38; 318/400.17
(58) Field of Classification Search
USPC ............. 318/400.14, 400.38, 400.17, 400.29, 318/700, 712, 560, 640, 721
See application file for complete search history.

(56) References Cited

U.S. PATENT DOCUMENTS

| 7,521,885 | B2 | 4/2009 | Schwarzkopf | |
|---|---|---|---|---|
| 7,750,585 | B2 | 7/2010 | Schwarzkopf | |
| 2006/0097598 | A1* | 5/2006 | Lelkes et al. ................... | 310/180 |
| 2007/0075662 | A1 | 4/2007 | Yukitake | |

FOREIGN PATENT DOCUMENTS

| DE | 38 19 065 C3 | 5/1995 |
|---|---|---|
| DE | 101 27 670 A1 | 9/2002 |
| EP | 1 734 648 A1 | 12/2006 |
| WO | 2005/048444 A1 | 5/2005 |

OTHER PUBLICATIONS

International Search Report of PCT/EP2011/001492.

* cited by examiner

*Primary Examiner* — Karen Masih
(74) *Attorney, Agent, or Firm* — Laurence A. Greenberg; Werner H. Stemer; Ralph E. Locher

(57) ABSTRACT

A method and a control device operate a three-phase brushless direct current motor with phase windings that are fed by an inverter connected to a voltage source having a high potential and a low potential. The semiconductor switches of the inverter are arranged in a bridge circuit and are controlled such that current always flows through two phase windings during motor operation. The motor is operated with normal commutation when the rotational speed is greater than or equal to a minimum rotational speed, wherein the angles are shifted by 60°. During start-up operation, up to the minimum rotational speed, a high-potential-side commutation angle of a phase winding is shifted toward a low-potential-side commutation angle of the phase winding by an angle greater than 0° and less than or equal to 60° with respect to the normal commutation.

3 Claims, 5 Drawing Sheets

METHOD AND CONTROL DEVICE FOR OPERATING A THREE-PHASE BRUSHLESS DIRECT CURRENT MOTOR

CROSS-REFERENCE TO RELATED APPLICATION

This application is a continuation, under 35 U.S.C. §120, of copending international application No. PCT/EP2011/001492, filed Mar. 24, 2011, which designated the United States and which claims the priority of German patent application No. DE 10 2010 019 494.8, filed May 6, 2010; the prior applications are herewith incorporated by reference in their entirety.

BACKGROUND OF THE INVENTION

Field of the Invention

The invention relates to a method and to a control device for operating a three-phase brushless direct current motor, the phase windings of which are fed by an inverter connected to a voltage source having a high potential and having a low potential. The semiconductor switches of the inverter, arranged in a bridge circuit, are controlled in such a manner that current always flows through two phase windings during motor operation.

A method of that type is known, for example, from published patent application No. US 2007/0075662 A1, from U.S. Pat. No. 7,750,585 B2 (European published patent application EP 1 734 648 A1), and from U.S. Pat. No. 7,521,885 B2 (WO 2005/048444 A1).

A brushless direct current motor usually has a rotor (armature) with permanent magnets and a three-phase star- or delta-connected winding which forms the fixed stator. If the winding is suitably supplied with current, it generates a position-dependent magnetic field in accordance with which the permanent magnets on the rotor are aligned. A continuous rotational movement of the rotor is achieved in that the rotational position of the rotor is measured by means of sensors. Depending on the rotational position of the rotor, the windings are supplied with current via electric or electronic switches in such a manner that a rotary field is produced in the stator which is followed by the rotor. The rotor essentially rotates synchronously with the rotary field of the stator.

According to German published patent application DE 101 27 670 A1, the so-called block commutation is a usual method for controlling a three-phase brushless motor. In this context, abruptly changing drive voltages are applied to the three phases forming a star connection. While in this star connection, first ends of the phase windings are electrically connected to one another, the second ends of the phase windings are connected to a control circuit which has six power switches. Two power switches are in each case series-connected between two voltage poles. Between in each case one series-connected In block commutation, the phases in the star connection are controlled in such a manner that a current always flows through two phases or phase windings while one phase (phase winding) remains without current. In the delta connection, current always flows through the three phase windings. The winding of the stator is such that the rotor passes all three phases only once during a revolution so that the duration of an electrical wave of a phase in time corresponds to the duration of a mechanical wave, i.e. one revolution of the rotor, in time. Successive electrical waves of successive phases are spaced apart by 120°, 360° relating to a full electrical wave. The commutation angle, i.e. the angle during which current flows through a phase (phase winding), is 120°. No current flows through the phase during 60° of each electrical half wave. After 60° in each case, the current is switched on to the next pair of phases.

The resultant variation of the torque which acts on the rotor is not free of waves. Instead, there is a so-called torque waviness. Furthermore, the voltage induced in the phases by the rotor, i.e. the electromotive force (EMF) is not optimally utilized with such a control method, with the consequence that the efficiency is also not optimal.

To improve the torque waviness or the efficiency in motor operation, a method is known, for example from the above-mentioned DE 101 27 670 A1, in which a brushless three-phase electric motor is operated with block commutation. There, the electric motor is controlled in such a manner that the commutation angle is less than 180° and greater than 120°.

German patent DE 38 19 064 C3 describes a method for controlling a brushless direct current motor in which a commutation point is in each case advanced by a predetermined amount of time.

Generally, a distinction is made between regular or normal operation and start-up operation in motor operation. The regular or normal operation occurs between a minimum rotational speed and a maximum rotational speed of the direct current motor. In the start-up mode, the rotational speed is increased from zero (n=0) to the minimum rotational speed ($n_{min}$).

It is known that a brushless direct-current motor, especially for a radiator fan of a motor vehicle, exhibits a disturbing development of noise in start-up operation. At low rotational speeds as prevail in start-up mode, the noise of the direct-current motor is decisive for an interfering total noise level whereas the air noise of the radiator fan is negligible at low rotational speeds.

SUMMARY OF THE INVENTION

It is accordingly an object of the invention to provide a method and a control device for operating a three-phase brushless direct current motor which overcome the above-mentioned disadvantages of the heretofore-known devices and methods of this general type and which provides for an improvement in such a brushless direct-current motor with regard to the noise development in start-up operation.

With the foregoing and other objects in view there is provided, in accordance with the invention, a method for operating a three-phase brushless direct current motor, the direct current motor having phase windings fed by an inverter connected to a voltage source with a high potential side and a low potential side, the inverter having semiconductor switches arranged in bridge branches of a bridge circuit, and the semiconductor switches are controlled such that each phase winding has a 120° commutation angle and current always flows through two respective phase windings during motor operation.

The method comprises operating the direct current motor with normal commutation when a rotational speed thereof is greater than or equal to a minimum rotational speed and with shifted commutation during motor operation in start-up mode, while the direct current motor is driven up to the minimum rotational speed.

During motor operation with normal commutation, offsetting the commutation angles referred to the respective phase winding by an angular amount of 60° and over a 360° cycle, producing an electrical connection to the high potential side for 120°, followed by a 60° angle without electrical connection, followed by a 120° angle with electrical connection to the low potential side, and followed by a 60° part-cycle without electrical connection for each bridge branch with associated phase winding.

During motor operation in start-up mode, up to the minimum rotational speed of the direct current motor, during a connection of a semiconductor switch to the high potential side, shifting a commutation of a phase winding on the high potential side with respect to a commutation of the respective phase winding on the low potential side during a connection of a semiconductor switch to the low potential side by an angular amount greater than 0° and less than or equal to 60° between a beginning of the commutation on the high potential side and a beginning of the commutation on the low potential side of the respective phase winding for all phase windings, as referred to the normal commutation.

In other words, the invention is based on a method in which, for operating a three-phase brushless direct current motor, the phase windings (u, v, w) thereof are fed by an inverter connected to a voltage source having a high potential and arranged in a bridge circuit, in such a manner that in motor operation, with star connection, current is always supplied to two phase windings (u, v, w) and, with delta connection, is always supplied to all three phase windings.

With respect to the method for operating a three-phase brushless direct current motor, it is provided that during motor operation with normal commutation, the commutation angles are offset by an angular amount of 60°, wherein the direct current motor is operated with normal commutation when the rotational speed is greater than or equal to a minimum rotational speed. In start-up mode of the direct current motor—referred to the normal commutation—up to the minimum rotational speed of the direct current motor, a commutation angle on the high potential side of a phase winding is shifted by an angular amount of greater than 0° and less than or equal to 60° with respect to a commutation angle on the low potential side of this phase winding.

The control device according to the invention comprises an inverter and a bridge circuit with series-connected semiconductor switches between a high potential and a low potential of a voltage source in each of three bridge branches for operating or driving the direct current motor. The inverter also comprises a microcontroller which is arranged for executing the method according to the invention or one of its variants described in the text which follows with respect to circuit and/or program engineering so that the method according to the invention is performed automatically.

The microcontroller drives the semiconductor switches of the inverter in such a manner that two phase windings are always supplied with current. In this arrangement, a commutation angle at the high potential side of a phase winding is shifted with respect to a commutation angle at the low potential side of this phase winding by an angular amount of greater than 0° and less than or equal to 60° up to a minimum rotational speed of the direct current motor in start-up mode. Furthermore, the control device or the microcontroller, respectively, is arranged for operating the direct current motor with normal commutation when the rotational speed is greater than or equal to the minimum rotational speed, a distance of 60° being set between the 120° commutation angles. In this context, pulse-width-modulated drive (PWM drive) and application of current to the semiconductor switches of the phase windings is particularly advantageous.

Other features which are considered as characteristic for the invention are set forth in the appended claims.

Although the invention is illustrated and described herein as embodied in a method and control device for operating a three-phase brushless direct current motor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
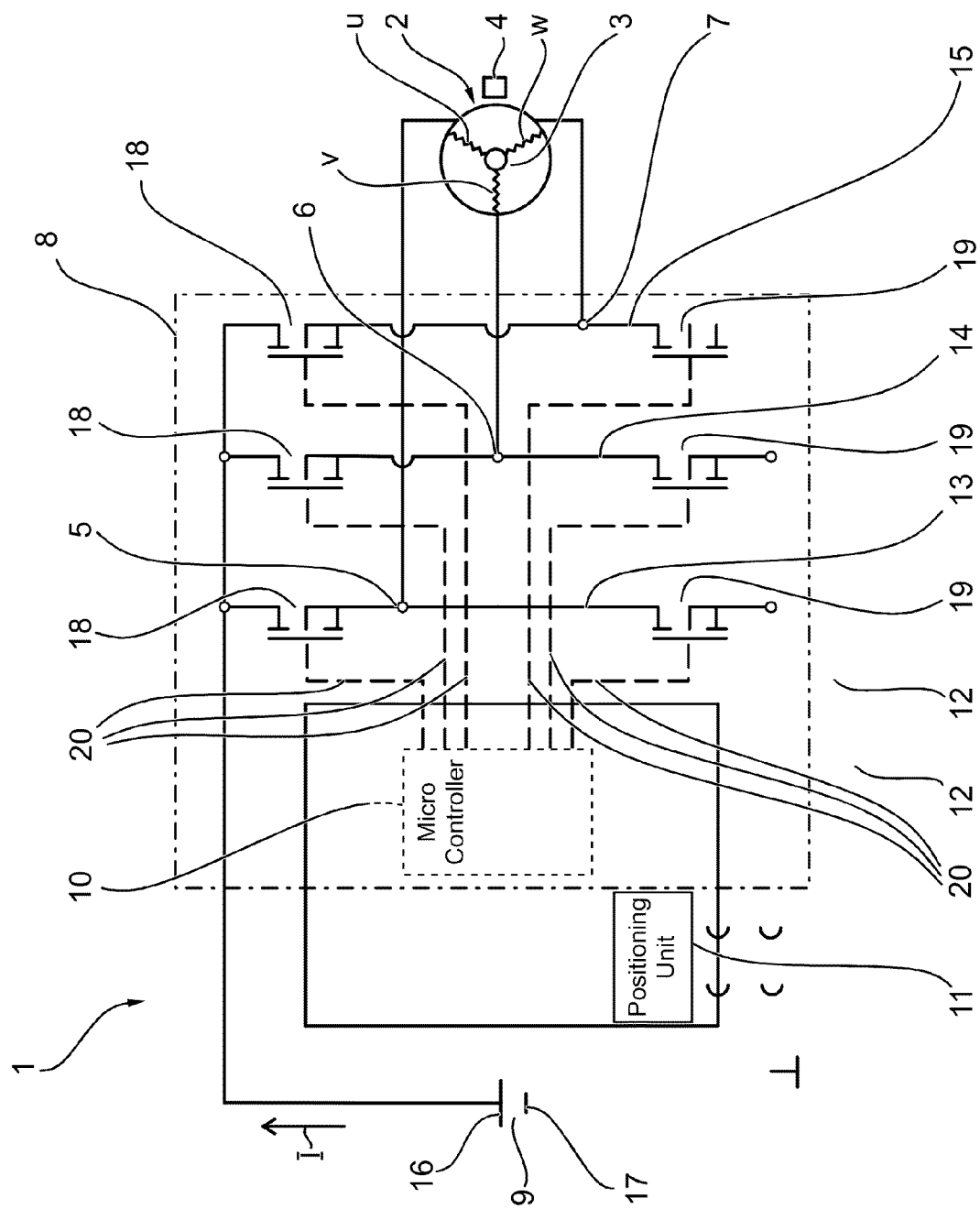
FIG. 1 is a block diagram illustrating, in a diagrammatic representation, a device for controlling a direct current motor having an inverter with semiconductor switches in a bridge circuit.

Referring now to the figures of the drawing in detail, where corresponding parts and magnitudes are provided with identical reference symbols, and first to FIG. 1 thereof, there is shown a block diagram of a device (control device) 1 for controlling a direct current motor 2. The direct current motor 2 comprises three phase windings u, v, w. In this arrangement, first ends of a first phase winding u, of a second phase winding v and of a third phase winding w are interconnected with one another to form a star connection 3. The phase windings u, v, w are arranged with an offset of 120° in a stator, in a manner not shown in greater detail, and they surround a rotational axis of a rotor provided with permanent magnets. Furthermore, a Hall sensor 4 is associated with the direct current motor 2. The phase windings u, v, w are interconnected at second ends with nodes 5, 6, 7 of a B6 topology of an inverter 8. The inverter 8 is indicated with a dot-dashed line box. The inverter 8 is, or can be, part of the control device 1.

The control device 1 also comprises a supply voltage source (direct-voltage source) 9 to supply the direct current motor 2 with electrical power, a microcontroller (microprocessor) 10 for determining the rotational speed n of the direct current motor 2 from the rate of change of position of the rotor positions determined, for example, by means of a positioning unit 11. The positioning unit 11 is connected to the Hall sensor 4 with respect to signals via signal lines 12.

The inverter 8 comprises in a bridge circuit a first, a second and a third bridge branch 13, 14 and 15, respectively, which are connected on a first side (high-potential side) to a high potential 16 of the direct-voltage source 9. On a second side (low-potential side), each bridge branch 13, 14, 15 is connected to a low potential 17 (ground) of the direct-voltage source 9. The direct-voltage source 9 in this embodiment is a vehicle battery.

Each bridge branch 13, 14, 15 comprises a first semiconductor switch 18 and a second semiconductor switch 19 which are connected in series between the high potential 16 and the low potential 17. In this arrangement, the first semiconductor switches 18 are connected directly to the high potential side 16 and the second semiconductor switches 19 are connected directly to the low potential side 17. In each bridge branch 13, 14, 15, the respective node 5, 6, 7 is allocated to the first semiconductor switch 18 and the second semiconductor switch 19. In this arrangement, the first node 5 of the first bridge branch 13 is in contact with the first phase winding u, the second node 6 of the second bridge branch 14 is in contact with the second phase winding v and the third node 7 of the third bridge branch 15 is in contact with the third phase winding w. The microcontroller 10 is connected to control inputs of the six semiconductor switches 18, 19, suitably via a control line 20 or the like, with respect to circuitry.

During motor operation, the microcontroller 10 of the inverter 8 effects a switching of the semiconductor switches 18, 19, in which a first semiconductor switch 18 on the high potential side connects one of the phase windings u, v, w to the high potential 16 and a second semiconductor switch 19 on the low potential side connects another phase winding u, v, w to the low potential 17 and thus forms a current path. In this context, the respectively other two first and second semiconductor switches 18, 19 of the high potential side 16 or of the low potential side 17, respectively, are opened, that is to say not switched to conduct. Due to the current I in the phase windings u, v, w of the current path of the direct current motor 2, a magnetic field is generated in accordance with which the permanent magnets become aligned with the rotor. In order to now produce a rotational movement of the rotor, the phase windings u, v, w are commutated by switching of the semiconductor switches 18, 19, that is to say alternately supplied with current. In the case of an appropriate application of current to the phase windings u, v, w, the magnetic field (exciter field) migrates along the phase windings u, v, w arranged offset by 120°. The rotationally movably supported rotor with permanent magnets becomes aligned with the exciter field and thus describes a rotational movement trailing the exciter field. In the case of a radiator fan motor 2 of a motor vehicle, a fan is attached to the rotor or its rotor shaft, respectively, which moves together with the rotor.

The microcontroller 10 and the positioning unit 11 are suitably arranged on a common circuit board. The microcontroller 10 can then utilize data determined by the positioning unit 11 for suitably switching or controlling the semiconductor switches 18, 19. Thus, the microcontroller changes from a start-up mode with a commutation with phase shift into a normal mode with normal commutation, for example when reaching a certain rotational speed of the direct current motor 2.

Figure 2:
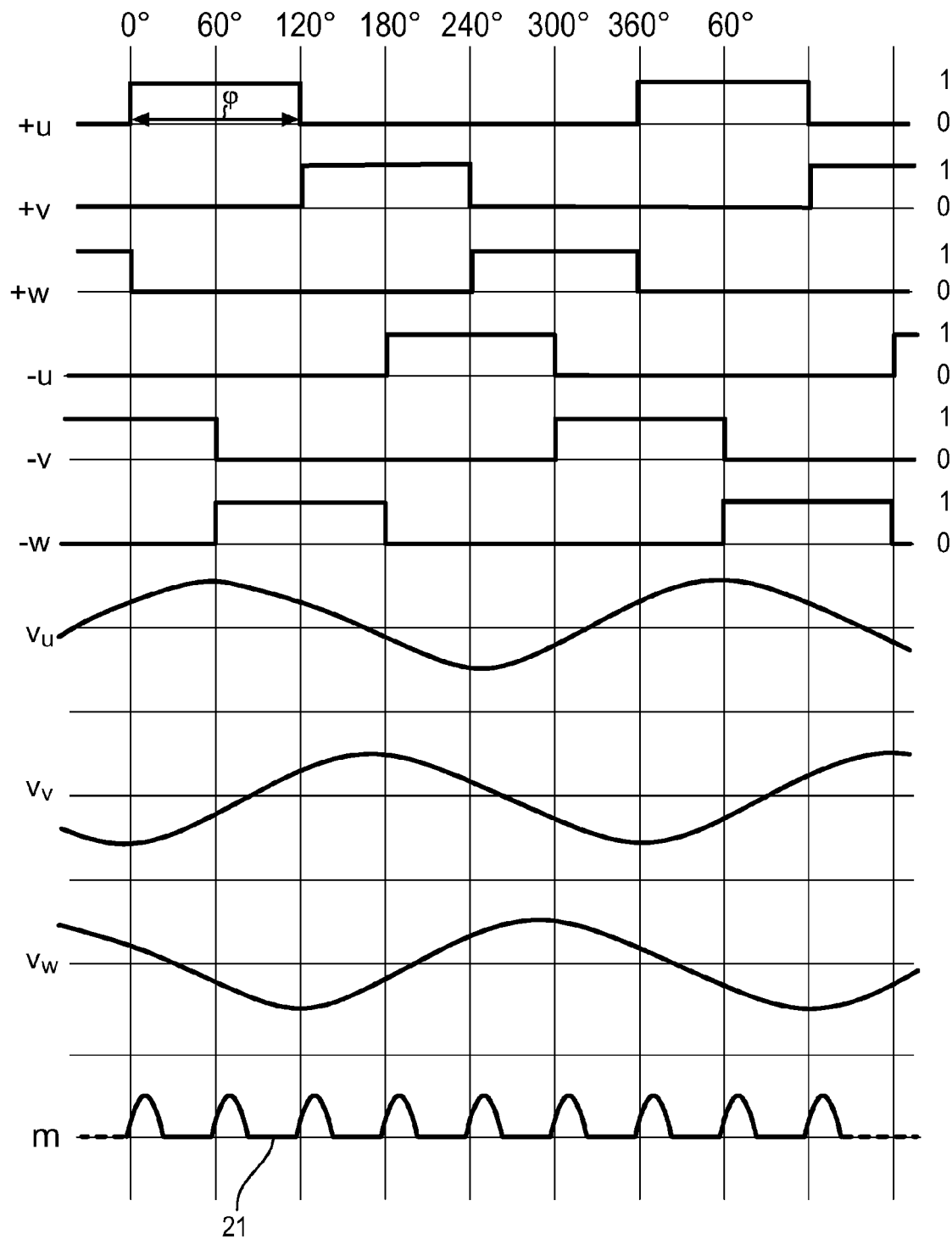
FIG. 2 is a flowchart of a switching sequence of the semiconductor switches with normal commutation through a 360° full cycle and, resulting from this, a voltage and a torque.

FIG. 2 shows in a flowchart the switching sequence of the semiconductor switches 18, 19, embodied as field effect transistors (FET) during normal commutation (block commutation). In this context, switching positions of the first and second semiconductor switches 18, 19 at the high potential and low potential side over a full 360° cycle (electrical full wave) and a corresponding voltage $V_u$, $V_v$, $V_w$ in the first, second and third phase winding u, v, w and a torque m of the direct current motor 2 are shown.

In a first, second and third response graph +u, +Fv, +Fw, the switch positions, produced by the microcontroller 10, of the first semiconductor switches 18, at the high potential side, of the first, second and third bridge branch 13, 14, 15 are shown which are interconnected with the first, second and third phase u, v, w. In this context, an open position is marked by "0" and a closed position by "1", wherein open position here means "electrically separated" and closed position means "electrically connected". In a fourth, fifth and sixth response graph −u, −v, −w, the switch positions of the second semiconductor switches 19, at the low potential side, of the first, second and third bridge branch 13, 14, 15 are shown.

Each of the six semiconductor switches 18, 19 switches in accordance with block commutation—is thus continuously in closed position over a full 360° cycle for a duration of 120°— and continuously in the open position for a duration of 240° of the full cycle. The first semiconductor switches 18 on the high potential side are switched successively offset by an angle of 120° in the order of first, second and third bridge branch 13, 14, 15 in the closed position. On the low potential side, the second semiconductor switches 19 are switched in the closed position offset by an angle of 120° in the order of first, second, third bridge branch 13, 14, 15. In this arrangement, the first semiconductor switch 18 of a bridge branch 13, 14, 15 and the second semiconductor switch of this bridge branch 13, 14, 15 is in each case switched into a closed position offset by 180°. This results in a short to the high potential side 16 for each bridge branch 13, 14, 15 with associated phase winding for 120° over one full wave, followed by a 60° angle without short, followed by a 120° angle with short to the low potential side 17 and followed by a 60° part-cycle without short.

In consequence, a switching sequence results over the full 360° cycle in which successively for the respective 60° part-cycles:

the first semiconductor switch 18 of the first bridge branch 13 on the high potential side and the second semiconductor switch 19 of the second bridge branch 14 (0° to 60°) on the low potential side, the first semiconductor switch 18 of the first bridge branch 13 on the high potential side and the second semiconductor switch 19 of the third bridge branch 15 (60° to 120°) on the low potential side, the first semiconductor switch 18 of the second bridge branch 14 on the high potential side and the second semiconductor switch 19 of the third bridge branch 15 (120° to 180°) on the low potential side, the first semiconductor switch 18 of the second bridge branch 14 on the high potential side and the second semiconductor switch 19 of the first bridge branch 13 (180° to 240°) on the low potential side, the first semiconductor switch 18 of the third bridge branch 15 on the high potential side and the second semiconductor switch 19 of the first bridge branch 13 (240° to 300°) on the low potential side, and the first semiconductor switch 18 of the third bridge branch 15 on the high potential side and the second semiconductor switch 19 of the second bridge branch 14 on the low potential side are switched into closed position (300° to 360°) while the respective remaining four semiconductor switches 18, 19 are switched into open position.

This switching sequence during normal commutation results in a commutation taking place in a 60° cycle over the full cycle, that is to say a change in the current flow from one phase winding u, v, w to another phase winding u, v, w or the change of a direction of current flow in a phase winding u, v, w. Each phase winding u, v, w has a 120° commutation angle ($\phi=120°$) during which current is applied to the phase winding u, v, w. In this arrangement, the commutation angle $\phi$ and the commutation point on the high potential side and the commutation point on the low potential side of a phase winding is offset by 180° over the full cycle.

Furthermore, the commutation angles φ on the high potential side and on the low potential side are in each case set successively offset by 120° in the order of first, second and third bridge branch 13, 14, 15. In this arrangement, the current I flows over a full cycle successively for the respective 60° part-cycles:

from the high potential 16 through the first phase winding u and via the second phase winding v to the low potential 17 (0° to 60°), from the high potential 16 through the first phase winding u and via the third phase winding w to the low potential 17 (60° to 120°), from the high potential 16 through the second phase winding v and via the third phase winding w to the low potential 17 (120° to 180°), from the high potential 16 through the second phase winding v and via the first phase winding u to the low potential 17 (180° to 240°), from the high potential 16 through the third phase winding w and via the first phase winding u to the low potential 17 (240° to 300°), and from the high potential 16 through the third phase winding w and via the second phase winding v to the low potential 17 (300° to 360°).

The counter-EMF (electromotive force) voltage, generated by the magnetic field of the motor 2, in the phase windings u, v, w is represented in voltage curves $V_u$, $V_v$, $V_w$. In this context, a maximum voltage $V_{u\,max}$ in the first phase winding u is reached by a 60° angle after a commutation point on the high potential side at which switching is effected for the short between the first phase winding u and the high potential 16. A minimum voltage $V_{u\,min}$ in the first phase winding u is reached by a 60° angle after the commutation point on the low potential side, that is to say the commutation point at which the short between the first phase winding u and the low potential 17 is effected. In the second and third phase v, w, the maximum or minimum phase voltage $V_{v\,max}$, $V_{v\,min}$, $V_{w\,max}$, $V_{w\,min}$ is reached in each case 60° after the commutation.

A torque characteristic 21 shows the torque m of the direct current motor 2 over the full 360° cycle. In this context, six torque peaks occur in a 60° cycle over the full cycle. The torque m effected by the motor current differs from zero and can fluctuate at a value of, for example, 25 mJ while the torque peaks can be, for example, up to 100 mJ.

Figure 3:
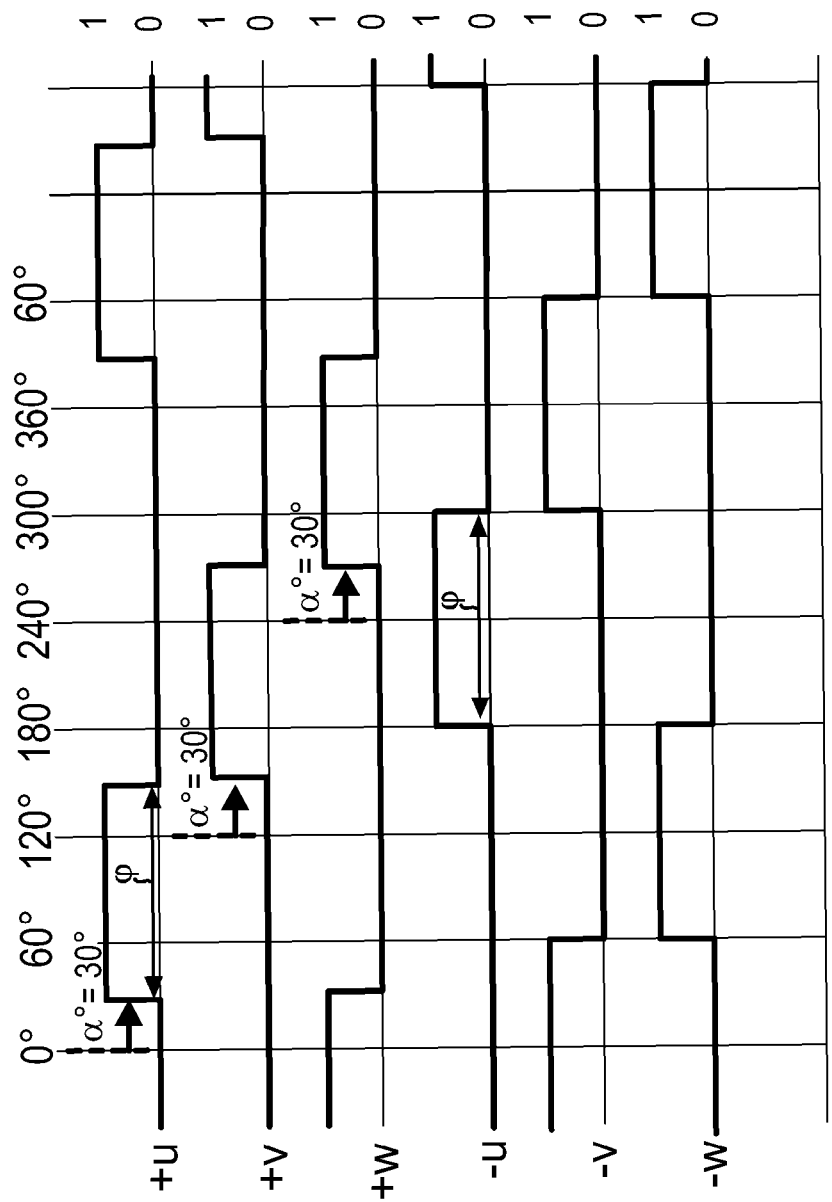
FIG. 3 is a flowchart illustrating the switching sequence with commutation with a 30° phase shift.

FIG. 3 shows in a sequence diagram the switching sequence with a 30° phase shift (α=30°). With reference to normal commutation, phase shift means that the commutation angle φ and thus also the commutation point on the high potential side and low potential side of a respective phase winding are shifted with respect to one another by an angular amount. In this context, the first and the second semiconductor switches 18, 19 are switched over a full cycle in each case for 120° successively with a 120° offset in the order of first, second, third bridge branch 13, 14 and 15, respectively, into closed position. In this arrangement, the switching of the first semiconductor switches 18 is offset forward by an angular amount α of 30° with respect to normal commutation.

During motor operation, at any point in time, a first and a second semiconductor switch 18, 19 from different bridge branches 13, 14, 15 are in each case in closed position whereas the remaining four semiconductor switches 18, 19 are in the open position. In consequence, this results in an asymmetric switching sequence in which commutation takes place alternatingly after an angular amount of 30° and after an angular amount of 90°. This results in a commutation sequence over a full cycle in which the current I flows successively over a full cycle from the high potential 16 via the first phase winding u and the second phase winding v to the low potential 17 (30° to 60°) for 30°, from the high potential 16 via the first phase winding u and the third phase winding w to the low potential 17 (60° to 150°) for 90°, from the high potential 16 via the second phase winding v and the third phase winding w to the low potential 17 (150° to 180°) for 30°, from the high potential 16 via the second phase winding v and the first phase winding u to the low potential 17 (180° to 270°) for 90°, from the high potential 16 via the third phase winding w and the first phase winding u to the low potential 17 (270° to 300°) for 30°, and from the high potential 16 via the third phase winding w and the second phase winding v to the low potential 17 (300° to 30°) for 90°.

Figure 4:
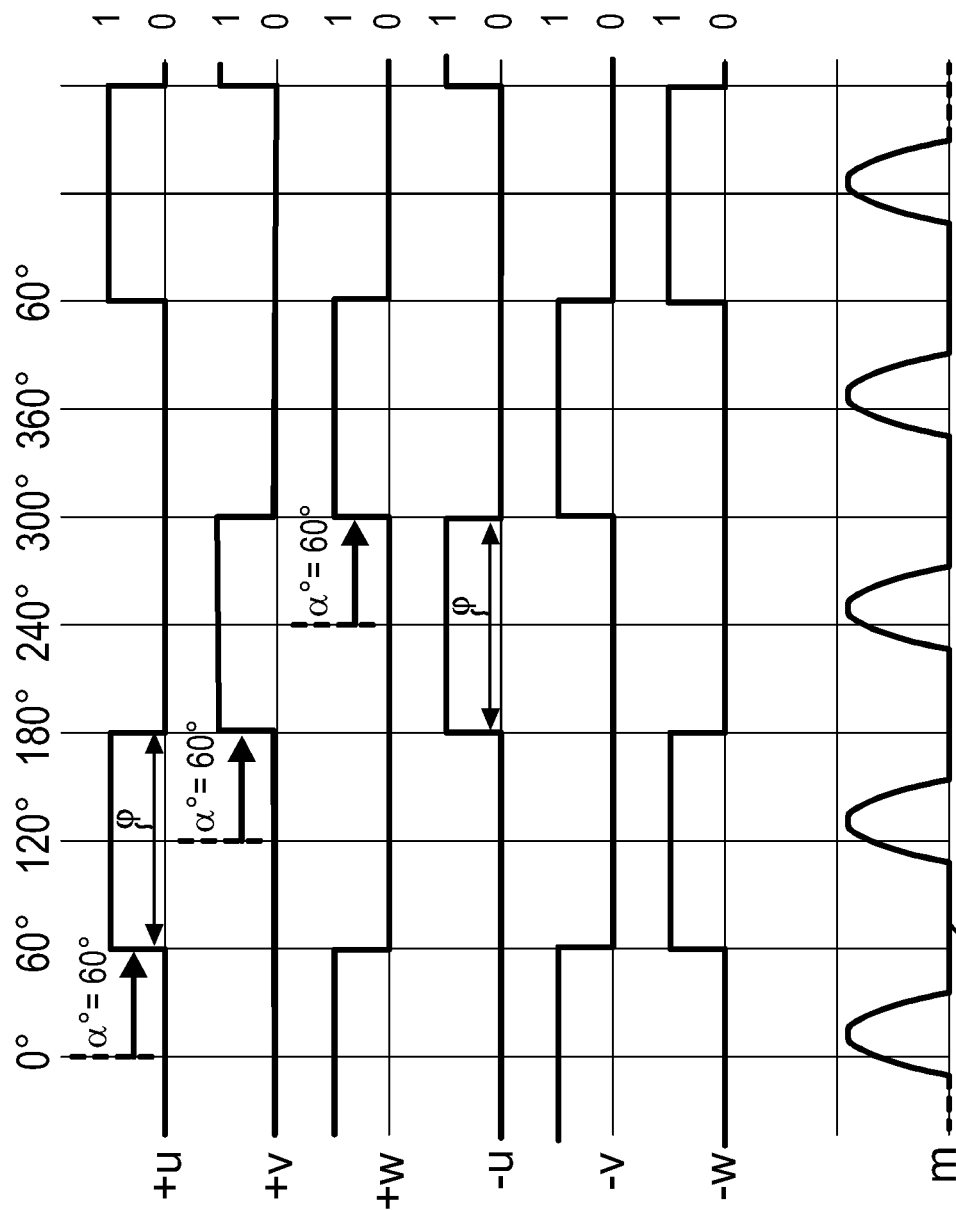
FIG. 4 is a flowchart illustrating the switching sequence with commutation with a 60° phase shift.

FIG. 4 shows in a sequence diagram a switching sequence with a 60° phase shift (α=60°). The first semiconductor switch 18 of the first, second and third bridge branch 13, 14, 15 is here successively in each case in closed position for 120° in one full cycle. The second semiconductor switch 19 of the first, second and third bridge branch 13, 14, 15 is in each case successively in closed position for 120° over a full cycle. For the remaining 240° in each case, each semiconductor switch 18, 19 is in the open position. In contrast to the normal commutation according to FIG. 2, at each exciter winding the commutation points on the high potential side of a phase winding u, v, w are displaced forward by 60° with respect to the commutation points on the low potential side. The commutation on the high potential side thus occurs later than with normal commutation by an angular amount α of 60°.

The result is that instead of six individual commutations, three double commutations take place over a full cycle. Double commutation means here that the current path is simultaneously changed on the high potential side and on the low potential side by simultaneous switching of a first semiconductor switch 18 and a second semiconductor switch 19. In this context, a phase winding u, v, w still carries current before and after the double commutation but the direction of flow of the current I is reversed. Thus, three switching states are produced over a full 360° cycle, in which successively the first semiconductor switch 18 of the first bridge branch 13 and the second semiconductor switch 19 of the third bridge branch 15 (60° to 180°) are switched into closed position for 120°, the first semiconductor switch 18 of the second bridge branch 14 and the second semiconductor switch 19 of the first bridge branch 13 (180° to 300°) are switched into closed position for 120°, and the first semiconductor switch 18 of the third bridge branch 15 and the second semiconductor switch 19 of the second bridge branch 14 are switched into closed position (300° to 60°) for 120°.

In consequence, two commutation angles φ vary synchronously with a respective switching state over the full 360° cycle in which the current I flows successively from the high potential 16 via the first phase winding u and the third phase winding w to the low potential 17 (60° to 180°) for 120°, from the high potential 16 via the second phase winding v and the first phase winding u to the low potential 17 (180° to 300°) for 120°, and from the high potential 16 via the third phase winding w and the second phase winding v to the low potential 17 (300° to 60°) for 120°.

During the switching of the semiconductor switches 18, 19, the first semiconductor switch 18 and the second semiconductor switch 19 of an identical bridge branch 13, 14, 15 are not simultaneously switched into closed position since otherwise a short circuit would be produced. The torque characteristic 21 shows over a full cycle of 360° three torque peaks which are higher (larger in amount) than the torque peaks shown in FIG. 2.

Figure 5:
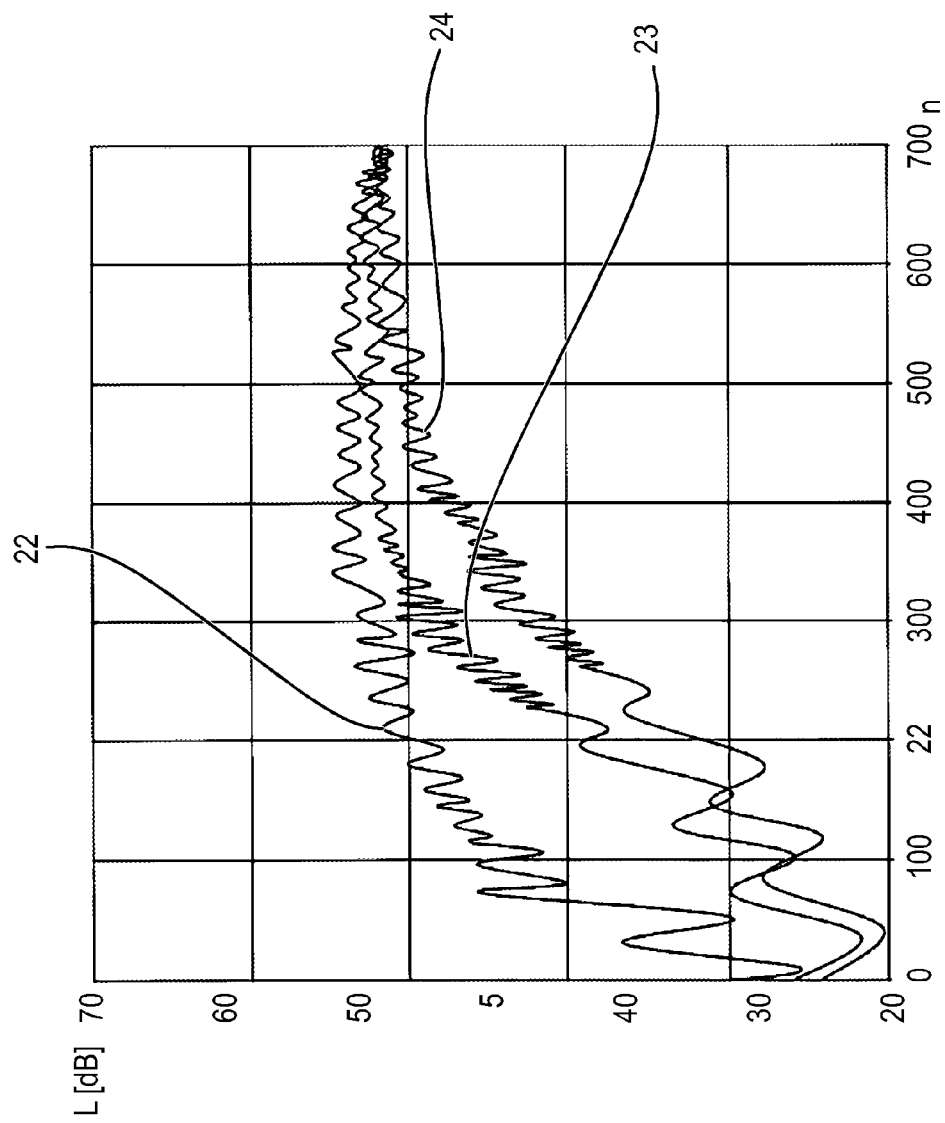
FIG. 5 is a decibel/rotational-speed diagram illustrating the noise characteristic of the direct current motor in start-up mode with normal commutation and with the commutation having the 30° phase shift and the 60° phase shift, respectively.

FIG. 5 shows in a graphical representation the motor noise of the brushless direct current motor 2 with respect to the rotational speed n of the direct current motor 2 in start-up mode of n=0 to n=700 revolutions per minute. In this context, a sequence curve for normal commutation for the phase shifts of 30° and 60° according to FIGS. 2, 3 and 4 is shown in each case. A first sequence curve 22 shows an early rise of the motor noise with normal commutation. In this context, a noise level of over 40 dB is exceeded with a rotational speed n=100 revolutions per minute and a noise level of 50 dB is exceeded at n=200 revolutions per minute. From a rotational speed of greater than n=200 revolutions per minute, the noise level of the direct current motor 2 remains within a range of between 50 dB and 60 dB.

A second sequence curve 23 shows the noise development for commutation with 30° phase shift according to FIG. 3. In this context, the rise of the noise level on start-up is lower than that at normal commutation. With the 30° phase shift, the noise level is about 40 dB at a rotational speed n=200 revolutions per minute and 50 dB at n=300 revolutions per minute. With the commutation with a 60° phase shift, a noise level of 50 dB is exceeded only at n=450 revolutions per minute as can be seen from a third sequence curve 24.

The following is a list of reference numerals and symbols used in the description:

1 Control device
2 Direct current motor
3 Star connection
4 Hall sensor
5 Node
6 Node
7 Node
8 Inverter
9 Supply voltage source
10 Microcontroller
11 Positioning unit
12 Signal line
13 First bridge circuit
14 Second bridge circuit
15 Third bridge circuit
16 High potential
17 Low potential
18 First semiconductor switch
19 Second semiconductor switch
20 Control line
21 Torque characteristic curve
22 Sequence curve
23 Sequence curve
24 Sequence curve
m Torque
n Rotational speed
u First phase winding
v Second phase winding
w Third phase winding
φ Commutation angle
α Phase shift angle
$V_u$ Voltage
$V_v$ Voltage
$V_w$ Voltage

The invention claimed is:

1. A method for operating a three-phase brushless direct current motor (2), the direct current motor having phase windings fed by an inverter connected to a voltage source with a high potential side and a low potential side, the inverter having semiconductor switches arranged in bridge branches of a bridge circuit, and the semiconductor switches are controlled such that each phase winding has a 120° commutation angle and current always flows through two respective phase windings during motor operation, the method which comprises:

operating the direct current motor with normal commutation when a rotational speed thereof is greater than or equal to a minimum rotational speed;

during motor operation with normal commutation, offsetting the commutation angles referred to the respective phase winding by an angular amount of 60° and over a 360° cycle, producing an electrical connection to the high potential side for 120°, followed by a 60° angle without electrical connection, followed by a 120° angle with electrical connection to the low potential side, and followed by a 60° part-cycle without electrical connection for each bridge branch with associated phase winding; and during motor operation in start-up mode, up to the minimum rotational speed of the direct current motor, during a connection of a semiconductor switch to the high potential side, shifting a commutation of a phase winding on the high potential side with respect to a commutation of the respective phase winding on the low potential side during a connection of a semiconductor switch to the low potential side by an angular amount greater than 0° and less than or equal to 60° between a beginning of the commutation on the high potential side and a beginning of the commutation on the low potential side of the respective phase winding for all phase windings, as referred to the normal commutation.

2. The method according to claim 1, which comprises, in start-up mode, shifting the commutation on the high potential side of the respective phase winding with respect to the commutation of the respective phase winding on the low potential side by an angular amount of 15°, 30°, 45° or 60°.

3. A control device for controlling a three-phase brushless direct current motor, the control device comprising:

an inverter connected between a high potential and a low potential of a voltage source;

said inverter having a bridge circuit with three bridge branches and each of said bridge branches having a series connection of a semiconductor switch on a high potential side conducted to the high potential and a semiconductor switch on a low potential side conducted to the low potential; and a microcontroller configured to drive said inverter for performing the method according to claim 1.

* * * * *